Jan. 19, 1954 — B. W. BADENOCH — 2,666,380
COOKING DEVICE FOR COOKING BATTERS
Filed Aug. 18, 1948 — 6 Sheets-Sheet 1

Inventor:
Benjamin W. Badenoch
By Dawson, Ooms, Booth & Spangenberg,
Attorneys.

Jan. 19, 1954   B. W. BADENOCH   2,666,380
COOKING DEVICE FOR COOKING BATTERS
Filed Aug. 18, 1948   6 Sheets-Sheet 3

Inventor
Benjamin W. Badenoch,
By Dawson, Ooms, Booth & Spangenberg,
Attorneys.

Jan. 19, 1954  B. W. BADENOCH  2,666,380
COOKING DEVICE FOR COOKING BATTERS
Filed Aug. 18, 1948  6 Sheets-Sheet 5

Inventor:
Benjamin W. Badenoch.

Jan. 19, 1954   B. W. BADENOCH   2,666,380
COOKING DEVICE FOR COOKING BATTERS
Filed Aug. 18, 1948   6 Sheets-Sheet 6

Inventor:
Benjamin W. Badenoch,
By Dawson, Ooms, Booth and Spencerberg,
Attorneys.

Patented Jan. 19, 1954

2,666,380

UNITED STATES PATENT OFFICE 2,666,380

COOKING DEVICE FOR COOKING BATTERS

Benjamin Wilson Badenoch, Los Angeles, Calif., assignor of one-half to McGraw Electric Company, Elgin, Ill., a corporation of Delaware Application August 18, 1948, Serial No. 44,848

18 Claims. (Cl. 99—329)

This invention relates to cooking devices and more particularly to devices for automatically baking articles such as muffins, biscuits, popovers and the like from batter.

In baking such articles as muffins and the like it has been the customary practice to place an appropriate batter in fixed molds or pans which are then placed in an oven to cook the batter. Upon completion of the cooking operation, it is necessary to remove the cooked articles by hand which requires handling of the hot molds and is apt to result in damage to the relatively fragile cooked articles. It is one of the objects of the present invention to provide a cooking device for batter in which all handling of the hot molds or of the cooked article is eliminated.

It is another object to provide a cooking device in which the batter is cooked in a mold cavity formed by relatively movable parts to loosen and eject the cooked article from the mold. In the preferred construction the cavity is formed in a mold plate having spaced downwardly projecting fingers and having a pronged or fingered ejecting member interfitting with the fingers on the plate and movable relative thereto to loosen and eject the cooked article.

Still another object is to provide a cooking device in which the mold plate is rotatable to eject the cooked article when inverted, and the movable ejecting member is moved relative to the mold plate by the inversion thereof.

A further object is to provide a cooking device in which the mold plate is covered to define an oven space and heat is applied both to the mold plate and the oven space. According to one feature of the invention, heat is supplied by stationary heating elements adjacent the mold plate and supplying heat to the mold plate and oven space by radiation and conduction through the mold plate and the cover.

A still further object is to provide a cooking device in which the supply of heat is automatically controlled in response to oven space temperature during a cooking operation, and the cooking operation is terminated in response to a predetermined temperature of the mold plate. Preferably, termination of the cooking operation is accomplished by ejecting the cooked article from the mold.

Another object is to provide a cooking device in which the temperature is maintained at one value during a cooking operation and at a lower warming value when the mold is in its ejecting position or when the cover is opened.

Another object is to provide a cooking device in which the mold plate itself forms a part of a thermostatic control unit. For this purpose an elongated rod of different thermal characteristics than the mold plate is connected thereto at one end and the opposite ends of the rod and the mold plate are connected to a control unit.

A further object is to provide a thermostatic control unit for a cooking device capable of carrying a relatively heavy latching load and which can be tripped by a light tripping force. In the preferred form this mechanism includes a flexible strip loaded in compression and supported against bending in one direction together with a temperature responsive device for bending the strip in the opposite direction.

The above and other objects and advantages of the invention will be more readily apparent when read in connection with the accompanying drawings, in which—

Figure 3:
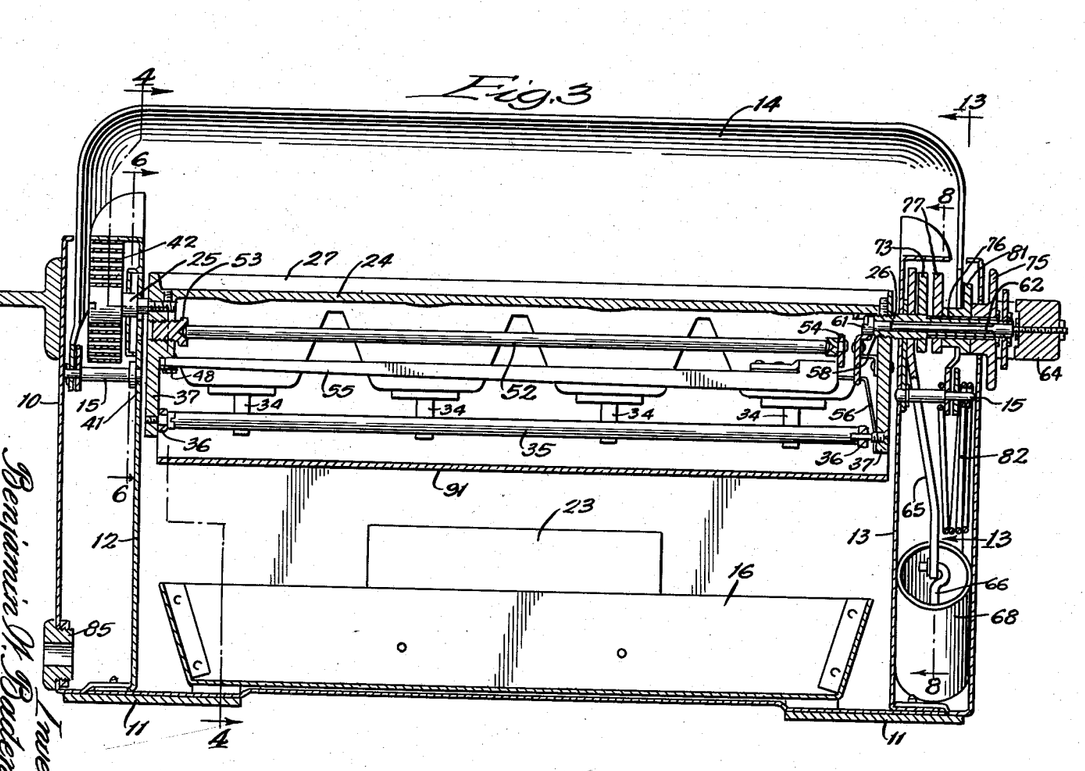
Figure 3 is a longitudinal section on the line 3—3 of Figure 1.

The device, as illustrated, comprises an outer casing 10 having flat end walls and curved side walls which are provided primarily for the purpose of appearance. The base of the casing may rest on insulating strips 11 formed of molded plastic material or the like for supporting the casing on a table surface. Within the casing spaced from the end walls thereof are upright supporting walls 12 and 13 which with the casing form a framework for supporting the operating mechanism. The top of the casing is open and is closed by arcuately curved covers 14 which are hinged on pins 15, as seen in Figure 3.

Within the upper part of the casing is the mold structure and heating elements to be described in detail hereinafter. For baking muffins or the like, the covers are swung to an open position, batter is inserted in the molds and the covers are closed. At the end of a baking operation the cooked articles are ejected from the mold which is inverted during the ejecting process so that the articles will drop into a receiving pan 16 in the lower part of the casing. The entire casing will be warmed by the heating elements so that the cooked articles will be kept warm in the pan 16 until it is desired to remove them for use. For this purpose one side of the casing is formed with a hinged door 21 provided with a heat-insulated handle 22. By opening the door the muffin pan may be clasped by insulating handles 23 and removed from the casing.

The mold structure

The mold cavities for receiving the batter to be cooked are formed in a mold plate 24 which is pivotally mounted in the upper part of the casing for turning movement about pivot supports 25 and 26. The plate is preferably formed of a good heat conducting material such as an aluminum casting and may be formed around its edge with an upstanding flange 27 to prevent overflow of batter. The flange preferably lies close to the end plates 12 and 13 and to side heater casings to be described hereinafter to prevent any passage of spilled batter around the plate.

Figures 17, 18, 19:
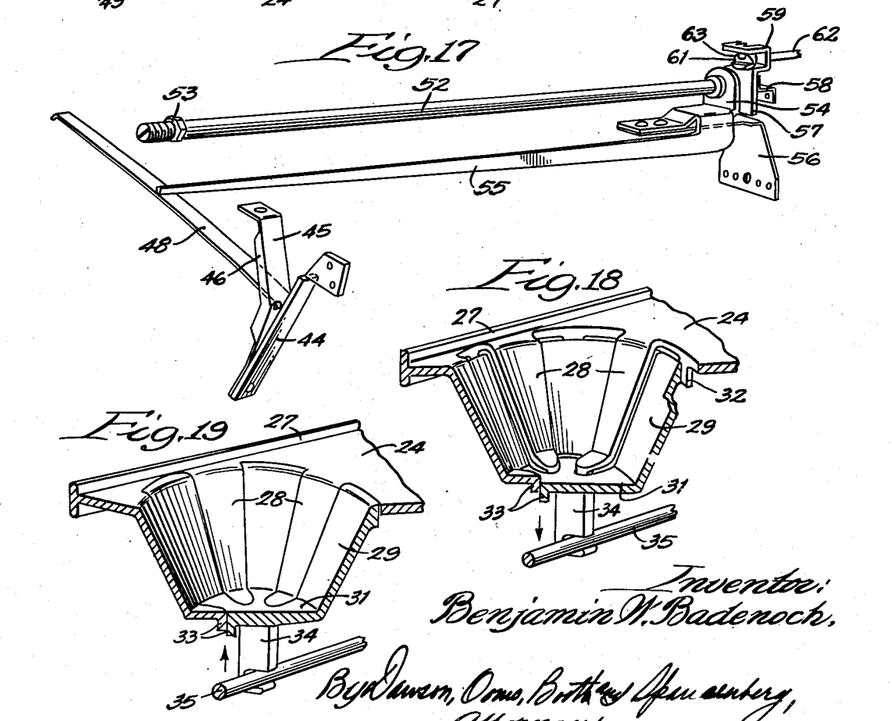
Figure 17 is a perspective view of the thermostatic latch control mechanism.
Figures 18 and 19 are partial perspective sections showing the construction of the mold cavities.

The mold plate is formed with a plurality of openings therethrough, any desired number of which may be provided, and has around each opening a series of downwardly and inwardly projecting fingers 28 as best seen in Figures 18 and 19. As there shown, the fingers extend downwardly and inwardly in a generally conical formation and turn inward at their lower ends to provide a portion of a flat bottom for the mold cavities.

The cavities are completed by a movable ejector member which is formed to interfit with the fingers 28 and which includes a series of spaced fingers 29 complementary to the fingers 28 to fit between them. The ejector member is completed by a flat bottom portion 31 cut out at its edges to receive the lower ends of the fingers 28 so that the ejector member can move normal to the mold plate in both directions. Preferably guide projections 32 are formed on the mold plate to engage and guide the upper ends of the fingers 29, and similar projections 33 are provided at the lower ends of fingers 28 and on the bottom plate 31 of the ejector member. In this way the mold plate fingers and the ejector member are accurately guided relative to each other to maintain a close interfitting relation between them. When the mold plate and ejector member are in register as shown in Figure 19, a complete mold cavity having a relatively smooth continuous inner surface is formed to receive batter. During the ejecting operation, as explained hereinafter, the ejector member moves relative to the mold plate, as illustrated in Figure 18, to break the cooked article away from the cavity surface.

The ejector members for each of the mold cavities are simultaneously controlled by providing in the bottom of each closure member a downwardly projecting control lug 34 having an open notch therein to receive an operating rod 35. The operating rods 35 form a part of a rectangular framework having cross members 36 at its ends pivoted on extensions 37 at the ends of the mold plate as best seen in Figure 3. One of the cross members 36 is provided with an extension 38 (Figures 6 and 7) which is turned over at its outer end to engage a cam slot 39 formed in a cam plate 41 which is rigidly secured in the end plate 12.

Figure 6:
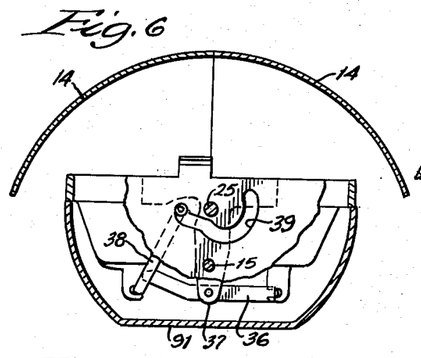
Figure 6 is a partial section on the line 6—6 of Figure 1 showing the mold in an upright position.
Figure 7:
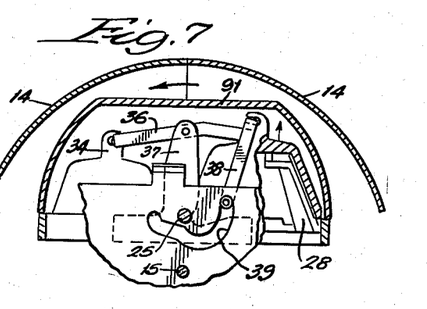
Figure 7 is a view similar to Figure 6 showing the mold inverted.

When the mold is in its upright cooking position, as shown in Figures 3 and 6, the rods 35 will lie in the neutral position to align the ejector members with the fingers on the mold plates so that the cavities are in the condition shown in Figure 19 to receive batter. As the mold plate is inverted to the position shown in Figure 7, the cam slot 39 will rock the framework to move the rod 35 at one side upward and simultaneously move the rod 35 at the other side downward. Upon further movement, rocking of the framework will be reversed to reverse the movements of the rods and ejector members associated therewith. Thus by the time the mold plate is completely inverted to the position of Figure 7, the ejector member associated with each cavity will have moved first in one direction and then in the other direction to the mold plate completely to loosen the baked article from the cavity. It will be noted that during movement of the ejector member downward as shown in Figure 18, the cooked article is supported by the fingers 28 over a substantial portion of its area so that it will be stripped from the ejector member without any possibility of damage. During movement in the opposite direction, the ejector member will strip the article from the fingers 28 so that when the mold plate is completely inverted the article will be loosened and will drop from the mold plate into the warming pan 16.

Mold actuation

Figures 4, 5:
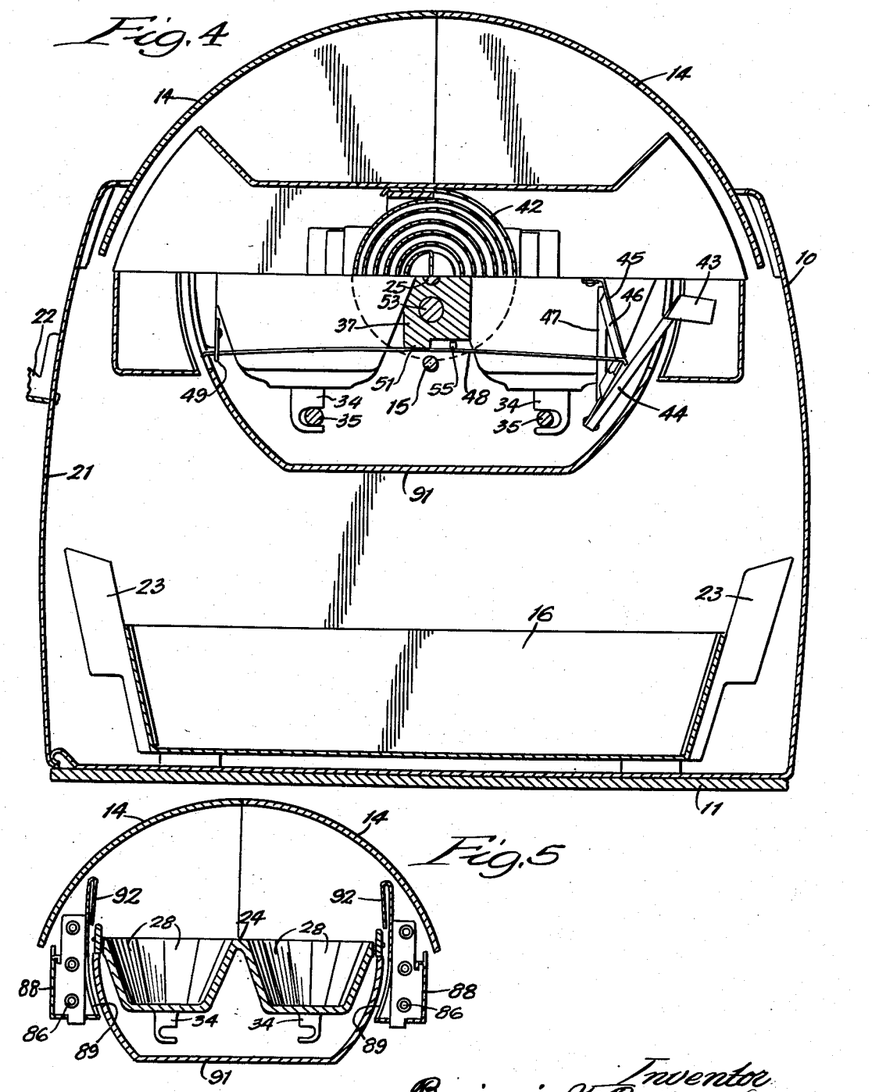
Figure 4 is a transverse section on the irregular line 4—4 of Figure 3.
Figure 5 is a partial transverse section on the line 5—5 of Figure 1.

The mold plate is normally urged to its inverted position by a spiral spring 42 connected to the pivot pin 25 and lying between the end plate 12 and the end of the casing. The mold is held in its upright position against turning in response to the spring 42 by a latch mechanism best seen in Figure 4. This mechanism comprises a fixed latch member 43 secured to the end plate 12 and adapted to be engaged by a latch bar 44. The latch bar is supported by a flexible spring strip 45 attached at its upper end to the mold plate and at its lower end to the lower end of the latch bar 44. The spring strip 45 is preferably reinforced through its central portion by a flange 46 so that it will flex only adjacent its upper and lower ends and normally biases the latch clockwise, as seen in Figure 4, toward its engaged position. To prevent the latch from turning too far from its latched position, it is formed with an angular extension 47 which engages the spring strip 45 to limit clockwise turning of the latch. This extension will also prevent the latch from turning excessively in response to the latch loading thereon.

To prevent the latch from turning clockwise about its upper flexure point in response to the latch load, an elongated flexible column 48 is provided. The column 48 is preferably in the form of a spring strip. At its ends the column is formed with reduced ears which extend through openings in the spring strip 45 and in a fastening bracket 49 which is secured to the mold plate to secure the ends of the column in place, the fastenings preferably being sufficiently loose to permit a slight amount of pivoting. The column normally tends to bow upward as best seen in Figure 4, and its upward movement is limited by engagement with a stop block 51 carried by the mold plate. With the parts in the position shown in Figure 4, the column can support a substantial load in compression to hold the latch bar 44 engaged against the action of the spring 42 so that the mold plate is firmly held in the position shown. To release the latch the flexible column 48 is bent downward in its central portion so that it becomes relatively weak in compression and will enable the latch bar 44 to swing away from the stop 43 in response to the spring action and to the latch load. This operation is preferably performed in response to the temperature of the mold plate by the mechanism best seen in Figure 17. This mechanism comprises an elongated rod 52 which is formed of a material having a different thermo coefficient of expansion than the mold plate. One material which I have found to be extremely satisfactory is a glass or ceramic material having an extremely low coefficient of expansion. One end of the rod 52 seats in a socket 53 adjustably carried by the flange 37 at one end of the mold plate. The opposite end of the rod seats in a socket carried by an arm 54 formed integral with and extending at a right angle from an elongated tripper bar 55. The tripper bar is supported by one end of a spring fastening member 56 which is riveted to the extension 37 on the mold plate and which is biased in a direction to swing the tripper bar 55 downward.

Figure 16:
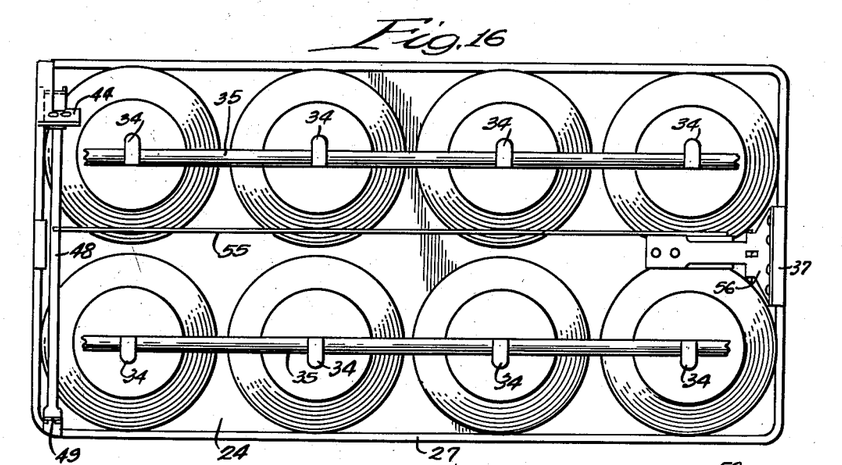
Figure 16 is a bottom plan view of the mold plate with the pan removed.

The spring 56 is formed with a slot therein, as shown in Figure 16, to receive a projection on the end of an adjustment lever 57. The adjustment lever is pivoted at a distance approximately one-third of its length upward from the spring 56 on a steel spring 58 which is fastened to the flange 37. Above its attachment to the spring, the lever is formed with an offset band indicated at 59, and the offset portion is formed with an opening to receive an enlarged circular end member 61 on the end of a shaft 62 which extends through the hollow pivot 26. The offset portion 59 of the lever 57 is formed with an inwardly bent tongue 63 which rests against the end 61 of the shaft 62. The spring 58 biases the lever 57 upward to hold the bottom of the opening therein against the head 61 of the shaft 62.

Figure 1:
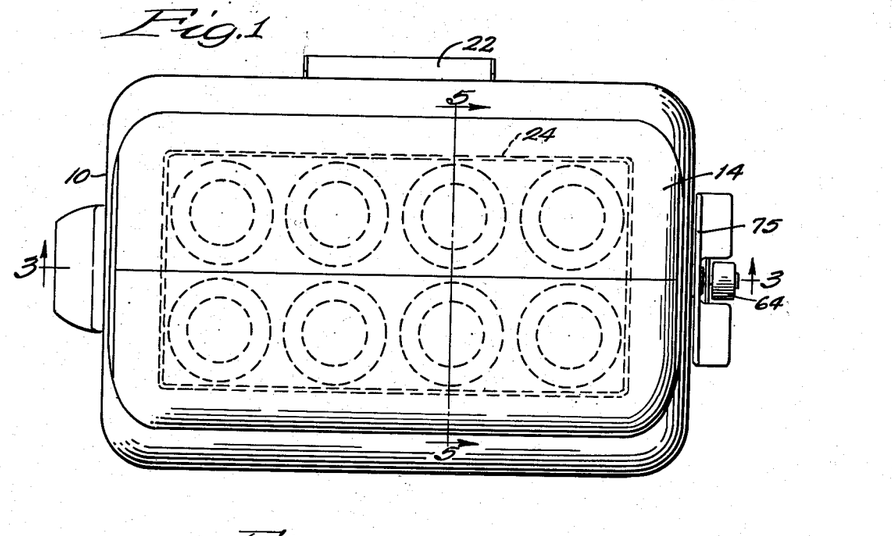
Figure 1 is a plan view of an automatic cooking device embodying the invention.
Figure 2:
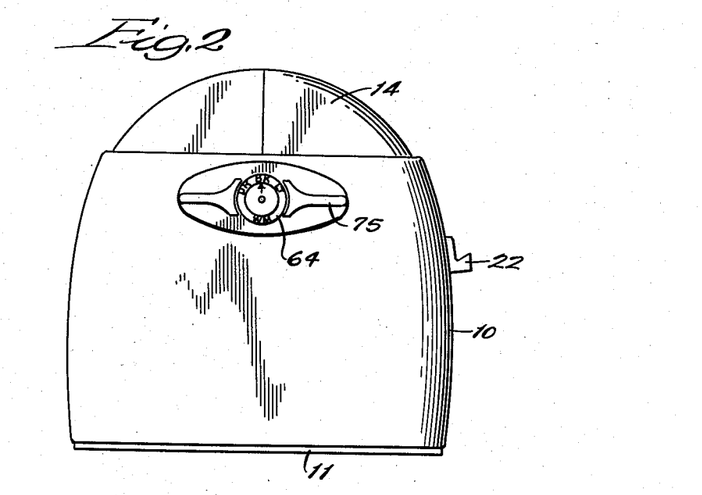
Figure 2 is an end elevation looking from the right of Figure 1.

During operating of the tripping mechanism when the end of the opening in the spring 56 engages the lower end of the lever 57 the moment of the lever about its spring 58 causes a reaction of the tongue 63 against the shaft end 61. The shaft end is formed with a milled cut as shown which lies at a small angle on the order of 3.5° from a perpendicular to the shaft axis and which preferably extends through half only of the shaft end. When the shaft 62 is rotated by a setting knob 64 on the exterior of the casing, the tongue 63 is moved in a direction parallel with the shaft axis to swing the lever 57 about its pivot spring 58 thereby changing the temperature at which the lower end of the lever 57 engages the spring 56. When the mold is relatively cool, the rod 52 engaging the upper end of arm 54 holds the tripper bar 55 in its upper position engaging a shoulder on the stop 51 as seen in Figure 4. As the temperature increases, the material of the mold plate will expand at a more rapid rate than the rod 52 allowing the spring 56 to shift the lever 54 and tripper bar 55 to the left. When the opening in the spring 56 engages the lower end of the lever 57, continued change in the relative length of the rod 52 and the mold plate will permit the tripper bar 55 to pivot downward about the lower end of the lever 57. A relatively slight amount of movement of the tripper bar will flex the column 48 downward to release the latch. It will be apparent that the point at which the lower end of lever 57 engages the spring so that the tripper bar 55 starts to pivot downward is determined by the adjustment of the knob 64 so that the temperature at which tripping will occur can easily be set. The knob 64 may be calibrated to indicate lighter or darker baking operations or in any other desired manner as shown in Figure 2.

With this construction it will be seen that the mold plate itself forms a part of the thermostatic control mechanism so that the control will be responsive to the average temperature of the mold plate throughout its length to provide a uniform control regardless of over filling or under filling of certain of the cavities. Thus very uniform baking is obtained.

*Damper control*

Figures 8, 9, 10, 11, 12:
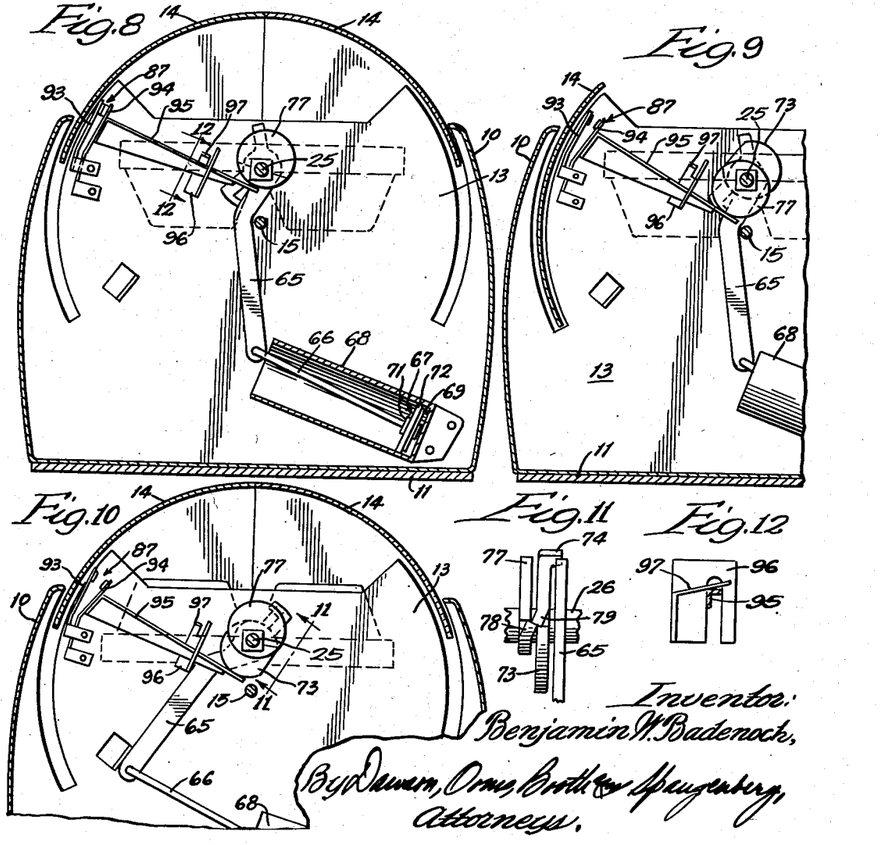
Figure 8 is a section on the line 8—8 of Figure 3.
Figure 9 is a partial view similar to Figure 8 showing the cover opened.
Figure 10 is a partial view similar to Figure 8 showing the mold inverted.
Figure 11 is a partial view on the line 11—11 of Figure 10.
Figure 12 is a partial section on the line 12—12 of Figure 8.

According to one feature of the invention, rotation of the mold after tripping the latch is damped to prevent too rapid movement which might damage the mechanism or the baked articles. As best seen in Figures 8, 9 and 10, a damper link 65 is rotatably mounted on the hollow pivot shaft 26 and extends downward between the inner wall 13 and the end wall of the casing. At its lower end the lever 65 is connected to a piston rod 66 which carries a piston 67 slidably fitting into a cylinder 68 fixedly mounted in the housing. The piston may comprise a pair of washers 69 and 71 secured on the piston rod on opposite sides of a flexible gasket 72, the washer 69 on the lower side of the piston being substantially larger than the washer 71 on the upper side of the piston.

To move the lever 65 when the mold is inverted and to make the dashpot effective during only the latter portion of the movement when the damping is required, the mechanism shown in Figure 11 is employed. This mechanism comprises a disc 73 which is rigidly secured to the pivot shaft 26 and which is formed with an angular extension 74 at one end to engage the upper projecting end of the lever 65.

When the mold is in its baking position, the parts will occupy the position shown in Figures 8 and 9 with the projection 74 out of engagement with the end of the lever 65. As the mold is swung clockwise, it can swing freely during approximately the first 135° of its travel at which point the projection 74 will engage the upper end of lever 65. Further rotation of the mold plate will rock the lever 65 clockwise to pull the piston 67 out of the cylinder 68. During this movement the gasket 72 is supported throughout most of its area by the large washer 69 so that it is relatively stiff and will offer considerable resistance to the flow of air past it. Thus the piston and cylinder provide an effective dashpot to damp the final turning movement of the mold plate. When the mold plate is swung back from its inverted to its baking position, the piston will be forced into the cylinder. During this time the gasket is supported only by the small washer 71 so that its edge can flex easily to offer minimum resistance to movement of the mold plate.

Mold cocking

After the mold has been inverted to remove the baked articles, it is returned to its upright position by turning a handle 75 on the outside of the casing concentric with the knob 64. The handle 75 is connected to a tubular shaft 76 which is concentric with the tubular pivot shaft 26 and which rotatably surrounds the same. At its inner end the shaft 76 carries a disc 77 which, as shown in Figure 11, is formed with an offset tooth portion 78 to engage a similar portion 79 on the disc 73. During inversion of the mold, the disc 73 and pivot shaft 26 can turn freely without affecting the disc 77. This is because of the fact that the disc 77 is normally rotated to a position in which the teeth 78 and 79 are circumferentially spaced so that the mold plate can turn to its fully inverted position before the teeth are brought into engagement.

To cock the mold the handle 75 is turned, turning with it the disc 77 through the engagement of the teeth 78 and 79. This will also turn the disc 73 the pivot shaft 26 and the mold plate. When the mold plate reaches its upright position, the latch mechanism described above will engage to hold it upright at which time the handle 75 can be returned to its normal position to move the tooth 78 away from the tooth 79.

Door operation

Figure 13:
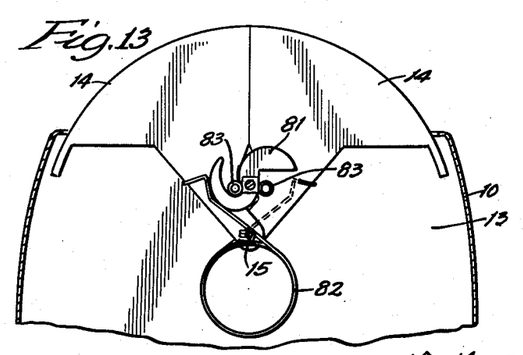
Figure 13 is a partial view on the line 13—13 of Figure 3.
Figure 14:
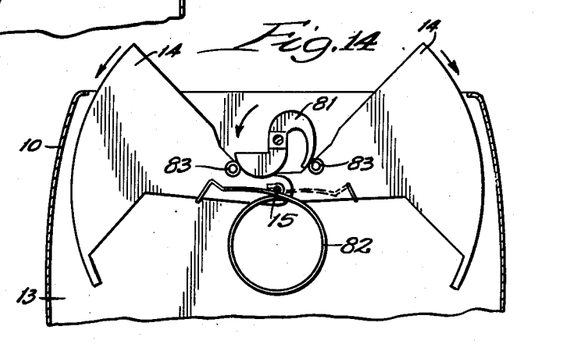
Figure 14 is a view similar to Figure 13 showing the covers opened.

During turning of the handle 75 to cock the mold, means are provided to open the upper doors 14 so that when the mold is in its upright baking position the doors will be opened and batter can be placed in the mold cavities. For this purpose the shaft 76 carries a door cam 81 which is shaped as best seen in Figures 13 and 14. The doors are normally urged closed by a torsion spring 82 which has extensions crossing the pivot shaft 15 for the doors and connected respectively to the doors. To open the doors, each door carries a roller 83 which respectively engage the opposite lobes of the cam 81.

When the handle 75 is in its normal position the cam 81 will occupy the position shown in Figure 13 so that the spring 82 can close the doors 14. During turning of the handle 75 to cock the mold, the cam 81 will rotate counter-clockwise from the position shown in Figure 13 to that shown in Figure 14. During this rotation the cam lobes engage the rollers 83 to force the doors progressively farther open until the mold is within 15° of its upright position. At this time each door will have turned approximately 44° from its closed toward its open position, and the cams are so shaped that further rotation thereof will produce no additional movement of the doors. Thus when the handle 75 has been turned to cock the mold and open the doors, there is nothing acting on the handle tending to return it so that the parts will remain in this position until the handle is again turned manually to its normal position. At this time batter can be placed in the mold cavities. When this operation is completed, the handle 75 can be turned back to its normal position to permit the spring 82 to close the doors for a baking operation.

The heating means

Figure 15:
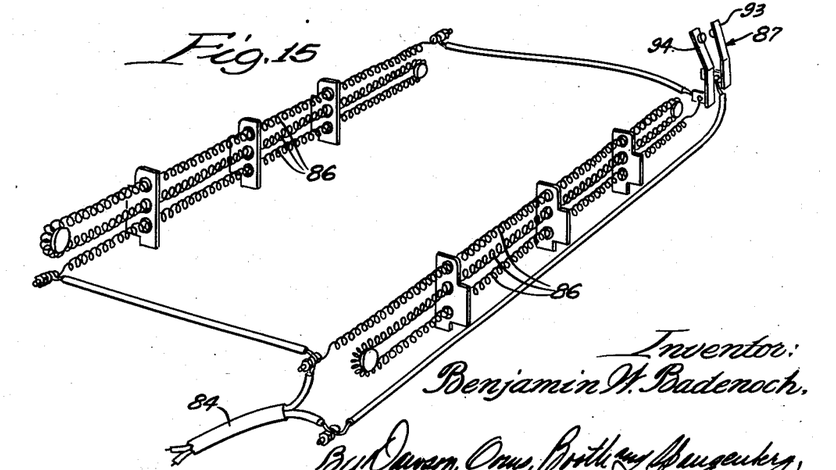
Figure 15 is a perspective view of the heating elements and thermostatic control therefor.

Heat for the baking operation is preferably supplied electrically as best seen in Figures 5 and 15. The electrical circuit comprises a power supply cord 84 which may extend through a suitable grommet 85 in the end of the casing as seen in Figure 3. The supply cord is connected to electrical heating elements 86 in parallel, the supply of current to both of the heating elements being simultaneously controlled through a thermostat indicated generally at 87 in Figure 15.

The heater elements are mounted in housings 88 as shown in Figure 5 which are fixedly supported in the casing between the end plates 12 and 13 at opposite sides of the mold plate. Preferably the insides of the housings 88 are plated or polished to increase their radiation and are open, as shown at 89, in register with the mold plate. Preferably the openings 89 are defined by relatively narrow strips registering with the cavities in the mold plate to prevent the baked articles from dropping from the mold plate before it is inverted.

To distribute the heat uniformly over the mold plate, a heat conducting pan 91 is secured to and underlies the mold plate to form therewith a hollow chamber. The pan 91 may be formed of a good conductive material such as aluminum and may be darkened on its outer surface in register with the heating elements to increase its absorption of radiant heat. The outer surface of the pan is preferably plated or polished to minimize radiation while its inner surface may be roughened or darkened to promote radiation, and the lower surface of the mold plate and the ejector members may similarly be darkened to increase absorption.

During a baking operation the pan 91 will become relatively highly heated by radiation from the heating elements and will, in turn, radiate heat uniformly over the lower surface of the molds. Thus the mold plate is heated uniformly throughout to produce uniform baking of batter in all of the cavities.

In addition to heating the mold plate, the space between the mold plate and the doors 14 which forms, in effect, an oven space may also be heated from the heater elements. For this purpose the doors are formed of a good heat conducting material such as aluminum and may be blackened on the inside to promote the absorption and re-radiation of heat. To prevent excessive heating of the sides of the mold cavities adjacent the heating elements, heat shields 92 may be provided extending upward from the insides of the housings 88 to a point adjacent but spaced from the inner surfaces of the doors. Due to the heat shields direct radiation of heat from the elements to the batter in the cavities is prevented so that excessive cooking at localized points is eliminated.

During baking the covers 14 absorb heat from the heating elements and re-radiate it on to the tops of the cavities to produce an even and uniform browning of the baked articles at their tops.

Thermostatic control

The supply of heat by the heating elements is automatically controlled in response to the temperature in the oven space normally to maintain this temperature substantially constant during a baking operation. For this purpose the thermostat 87 is provided which, as shown in Figures 8 to 10, is mounted adjacent the cover 14 within the oven space.

The thermostat 87 comprises a bimetal blade 93 which is fixedly mounted at one end on a bracket secured to the casing and a flexible blade 94 similarly mounted on the casing. The blades 93 and 94 are insulated from each other and carry contacts at their free ends which when engaged completes a circuit through the heating elements 86. In normal operation the contacts are engaged except when the temperature is above the value for which they are set, and when the temperature exceeds this value the thermostatic blade 93 will move away from the blade 94 to interrupt the circuit. In this way the thermostat normally maintains a constant temperature in the oven space.

To set the normal cooking temperature, the blade 94 can be moved to any one of a number of positions. For this purpose the blade 94 carries an arm 95 extending at a right angle therefrom and preferably insulated therefrom. The arm 95 extends through a bracket 96 secured to the housing and, as best seen in Figure 12, is formed with a slot in which the arm 95 can move. A stop arm 97 projects across the slot and is adapted to be engaged by the arm 95 to limit upward movement of the arm 95 in response to the resilience of the spring contact 94. By bending the stop arm 97, the position of the spring contact 94 can be determined to set the temperature at which the heating circuit will be maintained.

According to one of the features of the invention, the temperature maintained by the thermostat is reduced to a warm temperature value whenever the mold is in inverted position or the doors are opened. For this purpose the discs 73 and 77 are formed as cams or eccentrics to act on the arm 95 and adjust the thermostat.

As shown in Figures 8 to 10, when the doors are closed and the mold is in its upright position, both of the discs 73 and 77 are turned to a position to allow the arm 95 to rise to its maximum upward position in engagement with the stop finger 97. This is the normal baking position in which the baking temperature will be maintained in the oven space. When the mold inverts at the end of a cooking operation as shown in Figure 10, the disc 73 will be turned to swing the arm 95 downward and move the flexible contact 94 away from the thermostatic blade 93. With the blade 94 in this position the thermostat will maintain a lower temperature in the oven space sufficient to keep the cooked articles in the pan 16 warm but not sufficient to overcook them.

Similarly, when the doors are open as shown in Figure 9, the disc 77 is turned to swing the arm 95 down and move the blade 94 away from the thermostatic blade 93 to set the thermostat for a lower temperature. This operation not only prevents overcooking of any articles retained in the warming pan but also results in a substantial saving in heating current.

Operation

To operate the device as so far illustrated and described, the cord may be plugged into any suitable source of heating current, and the handle 75 may be turned to cock the mold and to open the doors. Preferably for the first operation the device is preheated by closing the doors and allowing it to operate through one cycle before inserting any batter. Following the pre-heating cycle the mold may be again righted and the doors opened so that batter can be placed in the several mold cavities.

With the knob 64 set for the desired baking and the cavities filled with batter, the doors 14 may be closed by turning the knob 75 to its normal position. Even though the mold was initially at its tripping temperature, insertion of the cold batter will cool it to a temperature substantially below the tripping temperature which for normal operation might be about 325° F. As soon as the doors are closed, the batter will start baking and the mold temperature will gradually rise to its tripping temperature of about 325° F. When the mold temperature reaches the tripping value, the latch 44 will be released as described above in connection with latch operation to permit the spring 42 to invert the mold. During mold inversion the baked articles will be loosened from the mold cavities and ejected therefrom upon completion of mold inversion into the warming pan 16. If it is desired to leave the articles in the warming pan, the device may be left in the tripping condition at which time the thermostat will maintain a reduced warm temperature on the order of 200° F. This will keep the baked articles warm without causing overcooking or burning thereof so that they can be removed for use at any desired time. For baking a second batch of articles, the handle 75 may be turned to again invert the mold and open the doors so that batter can be placed in the cavities.

It will be seen that with the present invention articles to be baked from batter, such as muffins, biscuits, popovers and the like, can be baked automatically without requiring any handling of hot molds or of the relatively fragile freshly baked articles. Uniformity of baking is insured by the oven space thermostat which maintains the cooking temperature constant and by control termination of the baking operation in response to the mold temperature. In this way differences in batters are automatically compensated so that very highly uniform results are obtained.

While one embodiment of the invention has been shown and described in detail herein, it will be understood that this is illustrative only and is not to be taken as a definition of the scope of the invention, reference being had for this purpose to the appended claims.

What is claimed is:

1. In a cooking device for cooking batter, a mold structure comprising a plate formed with a cavity having a plurality of spaced openings in its sides and an opening in its bottom, a closure having spaced portions fitting movably into the side openings and a portion fitting movably into the bottom opening to form with the plate a substantially smooth surface at the interior of the cavity, and means for moving the closure first in one direction and then in the other relative to the plate.

2. In a cooking device for cooking batter, a mold structure comprising a plate formed with an opening therein, integral spaced fingers on the plate adjacent the opening extending downward therefrom and inward at their lower ends partially to define a batter receiving cavity, a closure including a central portion to fit slidably between the ends of the fingers and upwardly extending spaced fingers fitting slidably between the fingers on the plate, and means to move the closure first in one direction and then in the other relative to the plate.

3. A cooking device for cooking batter comprising a frame, a plate pivoted on the frame on a horizontal axis, the plate being formed with a cavity having and opening therethrough extending partially over the bottom and one side of the cavity, a closure fitting slidably in the opening and forming with the plate a substantially smooth mold surface at the interior of the cavity, the plate and closure being rotatable on the frame from an upright to an inverted position, and means connecting the closure to the frame to move it first in one direction and then in the other relative to the plate as the plate and closure are rotated.

4. A cooking device for cooking batter comprising a frame, a plate pivoted on the frame on a horizontal axis, the plate being formed with a cavity having an opening therethrough extending partially over the bottom and one side of the cavity, a closure fitting slidably in the opening and forming with the plate a substantially smooth mold surface at the interior of the cavity, the plate and closure being rotatable on the frame from an upright to an inverted position, a cam track on the frame, and a follower movable in the cam track and connected to the closure to move it first in one direction and then in the other as the plate and closure are rotated.

5. A cooking device for batter comprising a frame, a substantially flat plate pivoted on the frame on a horizontal axis and formed with an opening therethrough, integral spaced fingers on the plate adjacent the opening extending downward and inward at their lower ends partially to define a batter receiving cavity, a closure including a central portion to fit slidably between the ends of the fingers and upwardly extending spaced fingers fitting slidably between the fingers on the plate, the plate and closure being rotatable on the frame from an upright to an inverted position, and means connecting the closure to the frame to move the closure first in one direction and then in the other relative to the plate as the plate and closure are rotated.

6. A cooking device for batter comprising a frame, a substantially flat plate pivoted on the frame on a horizontal axis and formed with cavities lying on opposite sides of the axis, each of the cavities having an opening therethrough, a closure member associated with each cavity and fitting slidably in the opening therein, a member pivoted on the plate on an axis parallel to the plate axis and operatively connected to the closure members, the frame being formed with a cam surface, and an extension on the last named member engaging the cam surface to rock the member first in one direction and then in the other as the plate is rotated.

7. A cooking device for batter comprising a mold plate formed with a cavity to receive batter, a dished pan rigidly secured to the mold plate with its edge portions extending around the edges of the mold plate and its bottom underlying the mold plate and spaced therefrom, heating means at the outer sides of the pan and directly exposed to the pan to transmit heat thereto, and an inverted dished cover overlying and spaced from the mold plate with its edges spaced laterally beyond the heating means and having a portion thereof directly exposed to the heating means to be heated thereby.

8. A cooking device for batter comprising a mold plate formed with a cavity to receive batter, a dished pan secured to the mold plate with its edge portions extending around the edges of the mold plate and its bottom underlying the mold plate and spaced therefrom, a frame, means mounting the mold plate and pan on the frame for pivotal movement about a horizontal axis, heating elements fixedly carried by the frame at the outer sides of the pan, and means for turning the mold plate and pan about said axis.

9. A cooking device for batter comprising a mold plate formed with a cavity to receive batter, a dished pan secured to the mold plate with its edge portions extending around the edges of the mold plate and its bottom underlying the mold plate and spaced therefrom, a frame, means mounting the mold plate and pan on the frame for pivotal movement about a horizontal axis, heating elements fixedly carried by the frame at the outer sides of the pan, an inverted dished cover overlying and spaced from the mold plate with its edges spaced laterally beyond the heating elements and directly exposed to the heating elements to be heated thereby, and means to turn the mold plate and pan about said axis.

10. A cooking device for batter comprising a mold plate formed with a cavity to receive batter, a dished pan secured to the mold plate with its edge portions extending around the edges of the mold plate and its bottom underlying the mold plate and spaced therefrom, a frame, means mounting the mold plate and pan on the frame for pivotal movement about a horizontal axis, heating elements fixedly carried by the frame at the outer sides of the pan, an inverted dished cover overlying and spaced from the mold plate with its edges spaced laterally beyond the heating elements and directly exposed to the heating elements to be heated thereby, baffles at the inner sides of the heating elements extending toward the central part of the cover to block the central portion of the cover and the top edge portions of the mold plate from direct radiation from the heating elements, and means to turn the mold plate and pan about said axis.

11. A cooking device comprising a mold to hold an article to be cooked, ejecting means associated with the mold to eject a cooked article therefrom, means to move the mold and ejecting means from a cooking to an ejecting position, heating means to heat the mold, a movable cover movable from a closed position over the mold to an open position, a thermostat controlling the heating means, and connections from the thermostat to the cover and the moving means to set the thermostat to a low temperature position when the moving means is in its ejecting position or the cover is open.

12. A cooking device comprising a mold to hold an article to be cooked, ejecting means associated with the mold to eject a cooked article therefrom, means to move the mold and ejecting means from a cooking to an ejecting position, heating means to heat the mold, a movable cover movable from a closed position over the mold to an open position, a thermostat controlling the heating means, the thermostat including an adjustable blade and a bimetal blade movable into and out of engagement with the adjustable blade in response to temperature, and means connecting the adjustable blade to the cover and the moving means to set the adjustable blade to a low temperature when the moving means is in its ejecting position or the cover is open.

13. A cooking device comprising a mold plate formed with a cavity to hold an article to be cooked, ejecting means connected to the mold plate to eject a cooked article therefrom, closure means fitting over the mold plate and forming therewith an oven space, heating means to heat the mold plate and oven space, thermostatic means responsive to the temperature in the oven space controlling the heating means to maintain the temperature constant, second thermostatic means responsive to the temperature of the mold plate to control the ejecting means, and means controlled by operation of the ejecting means to set the first thermostatic means for a lower temperature.

14. A cooking device comprising a frame, a mold plate pivoted on the frame on a horizontal axis and formed with a plurality of cavities to receive batter, ejecting means carried by the mold plate and movable relative thereto to eject cooked batter from the cavities, means connecting the ejecting means to the frame to operate the ejecting means when the plate rotates about the axis, closure means covering the plate and forming therewith an oven space, heating means to heat the mold plate and oven space, thermostatic means responsive to the oven space temperature controlling the heating means, and second thermostatic means responsive to the mold plate temperature to control turning of the mold plate from a cooking to an ejecting position, said second thermostatic means including an elongated rod extending adjacent and throughout substantially the full length of the mold plate.

15. A cooking device comprising a frame, a mold plate pivoted on the frame on a horizontal axis and formed with a plurality of cavities to receive batter, ejecting means carried by the mold plate and movable relative thereto to eject cooked batter from the cavities, means connecting the ejecting means to the frame to operate the ejecting means when the plate rotates about the axis, closure means covering the plate and forming therewith an oven space, heating means to heat the mold plate and oven space, thermostatic means responsive to the oven space temperature controlling the heating means, and second thermostatic means responsive to the mold plate temperature to control turning of the mold plate from a cooking to an ejecting position, said second thermostatic means including a rod having different thermal characteristics than the mold plate extending along and connected at its ends to the mold plate.

16. A cooking device comprising a frame, a mold plate pivoted on the frame on a horizontal axis and formed with a plurality of cavities to receive batter, ejecting means carried by the mold plate and movable relative thereto to eject cooked batter from the cavities, means connecting the ejecting means to the frame to operate the ejecting means when the plate rotates about the axis, closure means covering the plate and forming therewith an oven space, heating means to heat the mold plate and oven space, thermostatic means responsive to the oven space temperature controlling the heating means, resilient means urging the plate to turn to its ejecting position, a latch to hold the plate in its cooking position, a second thermostatic means responsive to the mold plate temperature to control the latch, and means operated by turning of the mold plate to set the first named thermosatic means to a lower temperature.

17. A cooking device comprising a frame, a mold plate pivoted on the frame on a horizontal axis and formed with a plurality of cavities to receive batter, ejecting means carried by the mold plate and movable relative thereto to eject cooked batter from the cavities, means connecting the ejecting means to the frame to operate the ejecting means when the plate rotates about the axis, closure means covering the plate and forming therewith an oven space, heating means to heat the mold plate and oven space, thermostatic means responsive to the oven space temperature controlling the heating means, resilient means urging the plate to turn to its ejecting position, a latch to hold the plate in its cooking position, an elongated rod extending along the mold plate and connected thereto at one end, the rod having different thermal characteristics than the mold plate, and means connecting the other end of the rod and the mold plate to the latch to release the latch when the mold plate and rod reach a predetermined temperature.

18. A cooking device comprising a frame, a mold plate pivoted on the frame on a horizontal axis and formed with a plurality of cavities to receive batter, ejecting means carried by the mold plate and movable relative thereto to eject cooked batter from the cavities, means connecting the ejecting means to the frame to operate the ejecting means when the plate rotates about the axis, closure means covering the plate and forming therewith an oven space, heating means to heat the mold plate and oven space, thermostatic means responsive to the oven space temperature controlling the heating means, resilient means urging the plate to turn to its ejecting position, a latch to hold the plate in its cooking position, an elongated rod extending along the mold plate and connected thereto at one end, the rod having different thermal characteristics than the mold plate, a flexible strip connected to the latch and loaded in compression to hold the latch engaged, and means operated by relative movement of the rod and mold plate in response to temperature to bend the center portion of the strip.

BENJAMIN WILSON BADENOCH.

References Cited in the file of this patent

UNITED STATES PATENTS

| Number | Name | Date |
|---|---|---|
| Re. 13,455 | Lanier et al. | Aug. 6, 1912 |
| 1,389,774 | Moore | Sept. 6, 1921 |
| 1,407,304 | Sharp | Dec. 21, 1922 |
| 1,528,050 | Forshee | Mar. 3, 1925 |
| 1,767,802 | Langos | June 24, 1930 |
| 1,796,134 | Worner | Mar. 10, 1931 |
| 1,808,866 | Scults | June 9, 1931 |
| 1,814,754 | James | July 14, 1931 |
| 1,870,476 | Babcock | Aug. 9, 1932 |
| 1,961,756 | French | June 5, 1934 |
| 1,971,012 | Macdonald | Aug. 21, 1934 |
| 1,977,084 | Person | Oct. 16, 1934 |
| 1,993,607 | Kalgren | Mar. 5, 1935 |
| 2,022,828 | Samuel | Dec. 3, 1935 |
| 2,038,361 | Hawes | Apr. 21, 1936 |
| 2,057,741 | Purpura | Oct. 20, 1936 |
| 2,065,318 | Lawrence | Dec. 22, 1936 |
| 2,074,044 | Bushway | Mar. 16, 1937 |
| 2,106,009 | Lee | Jan. 18, 1938 |
| 2,134,682 | Burch | Nov. 1, 1938 |
| 2,147,319 | Smith | Feb. 14, 1939 |
| 2,237,147 | Ireland | Apr. 1, 1941 |
| 2,250,997 | Miller | July 29, 1941 |
| 2,268,675 | Scharf | Jan. 6, 1942 |
| 2,290,572 | Rakor | July 21, 1942 |
| 2,386,426 | Brannon | Oct. 9, 1945 |
| 2,402,997 | Grayson | July 2, 1946 |
| 2,456,291 | Malone | Dec. 14, 1948 |
| 2,569,365 | Badenoch | Sept. 25, 1951 |

FOREIGN PATENTS

| Number | Country | Date |
|---|---|---|
| 454,824 | Great Britain | Oct. 8, 1936 |